July 14, 1931.  H. E. DOBSON  1,814,904

AUTOMATIC VALVE

Filed June 20, 1930

INVENTOR
Harry E. Dobson
BY
ATTORNEY

Patented July 14, 1931

1,814,904

UNITED STATES PATENT OFFICE

HARRY E. DOBSON, OF NEW YORK, N. Y.

AUTOMATIC VALVE

Application filed June 20, 1930. Serial No. 462,612.

The objects of this invention are to provide simple, practical and efficient valve mechanism for automatically releasing the air from liquid flow lines and which will be positive and reliable, safe in its action, relatively inexpensive and adapted to many different uses.

The foregoing and other desirable objects are attained in this invention by various features of construction, combination and relations of parts hereinafter defined and broadly claimed.

The drawings accompanying and forming part of the specification illustrates one practical commercial embodiment of the invention, but it should be understood that the structure may be modified and changed all within the broad spirit of the invention.

Figure 1:
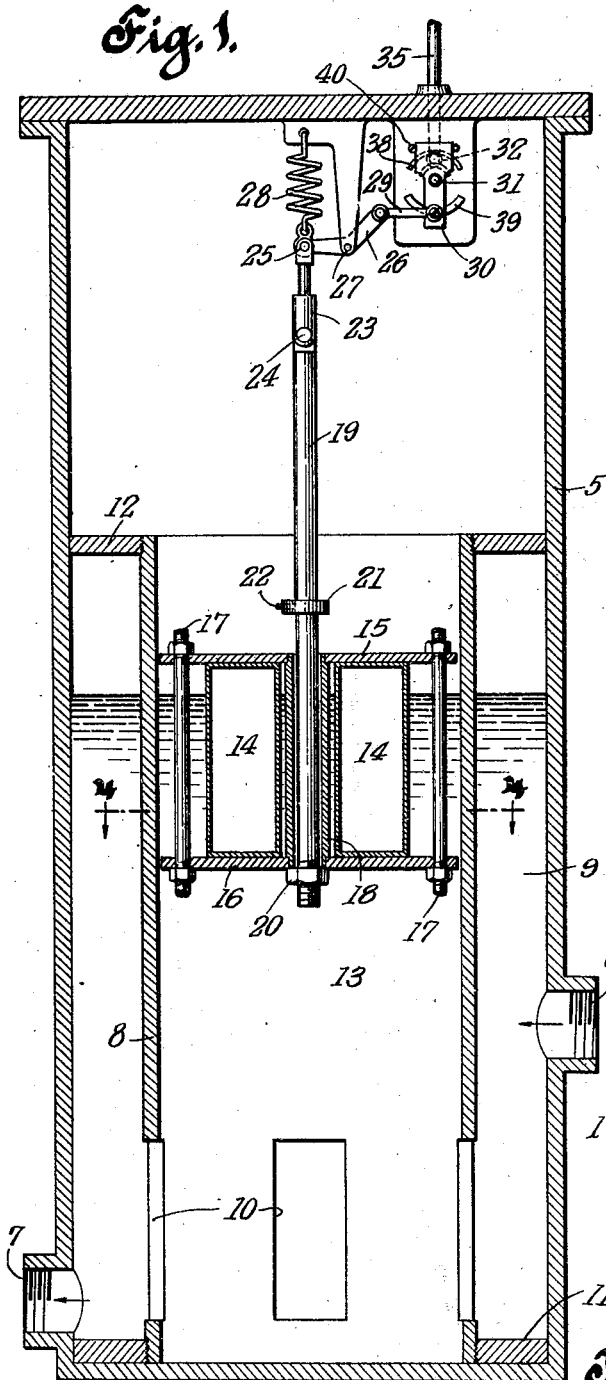
Figure 2:
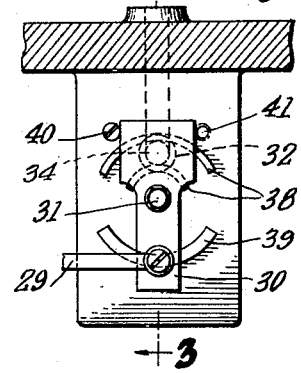
Figure 3:
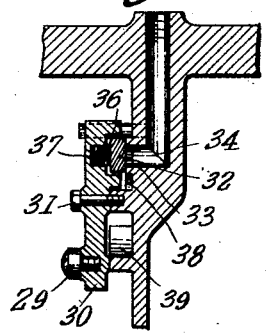
Figure 4:
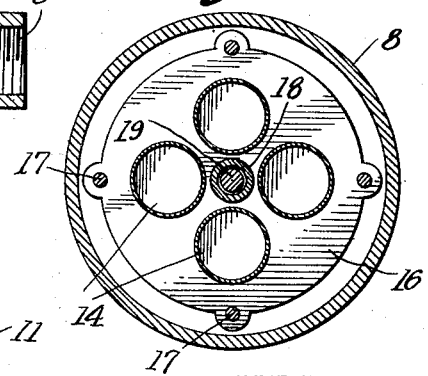

Fig. 1 is a broken vertical sectional view illustrating a practical embodiment of the invention; Figs. 2 and 3 are enlarged broken detail views of the self-adjusting air release slide valve, Fig. 3 being taken as on line 3—3 of Fig. 2; Fig. 4 is a cross-sectional detail as on the plane of line 4—4 of Fig. 1.

The body of the device is shown as consisting of a vertically extending chamber 5 having an inlet 6 in one side above the bottom and an outlet 7 in the opposite side, at a lower level. Concentrically disposed within the chamber is shown a baffle tube 8 resting on the bottom of the chamber and providing in conjunction with the surrounding wall of the chamber an annular compartment 9. This baffle tube is shown as slotted vertically in its lower portion at 10 and it is shown as positioned concentrically in the chamber by the screwed on end flanges 11, 12. This concentric baffle construction provides a deep central well 13 for the liquid and operating in this well is a float for automatically controlling the air release.

In the present illustration, the float is made up of a series of four hollow cylinders 14 formed of sections of tubing or the like and shown as clamped between upper and lower end plates 15, 16 by screw bolts 17. This float assembly is shown as having a central guide tube 18 caught between the top and bottom plates and loosely engaged about a valve actuating rod 19. To enable relative adjustment of the float on the rod 19, a nut 20 is shown engaged on the lower end of the rod below the loose float and a stop collar 21 is shown secured in adjusted relation on the rod above the float by a set screw 22.

A short link 23 is shown pivoted to the upper float rod at 24 and pivoted at 25 to a bell crank lever 26, which is pivotally mounted at 27. The upper end portion of the float rod is shown as acted on by a tension spring 28 tending to lift the rod and float.

The bell crank 26 is shown connected by a pivot link 29 with the lower end of a swinging lever 30 pivoted at 31 and carrying at its upper end a valve disc 32 for cooperative engagement with a valve seat 33. This valve seat surrounds the mouth of a port or passage 34 forming an air release from the top of the chamber and usually equipped with a suitable vent pipe 35.

To cause the valve disc to fit closely to its seat, said valve is shown as having a self-adjusting resilient mounting in the valve lever, as in Fig. 3, where said valve disc is shown as loosely engaged in a seat or pocket 36 in the upper end of the lever and as acted on by a spring 37 in the back of said pocket.

In order that this self-adjusting valve may operate smoothly over and away from the valve seat, arcuate ribs or extensions 38 are shown forming arcuate tracks curved concentrically with the mounting of the valve lever, so that the valve disc may slide smoothly thereover in approaching or leaving the valve seat.

To prevent binding of the lever and further assure smooth easy valve action, the lower end of the lever is shown as riding over an arcuate track 39.

A pin or other suitable stop 40 may be provided to limit the swinging movement of the valve lever in one direction, the same being engaged in one of two screw seats 41, dependent upon which way the valve may be intended to operate in different installations.

The float may be given different degrees of buoyancy, by using different numbers and different sizes of float cylinders and it may be set to different positions on the float rod, depending on the liquid level at which it is intended to shut off the air release. Usually, the float and spring may be balanced so that the float will pull the air valve open, as soon as the liquid no longer sustains the float. The air valve will then remain open to vent the air and vapor, so long as this condition exists. As soon however as the liquid rises sufficiently to take the weight of the float off the float rod, the air valve will be slid over into its closed position, thereby sealing the top of the chamber and providing an air cushion which will prevent hammer and assist in smooth even delivery of liquid through the flow line. If for any reason the spring should fail to close the air valve when it should, the further rise of liquid in the central well will cause the float by abutment with the upper stop shoulder 21 to positively shift the air valve to closed position. In its sliding movements, the air valve wipes the valve seat clean, preventing leakage and insuring a positive seal. At the same time this valve is easily moved by the leverage and linkage system disclosed, so that air is freely released up to the time that the device should become sealed. The spring 37 therefore is a relatively light or weak spring, sufficient only to maintain a slight friction surface contact of the valve disc with the valve seat and with the track leading to the valve seat, the actual sealing of the valve disc with the seat being effected by the prevailing pressure within the chamber when the valve is closed. The float is guided straight up and down by its loose sliding fit in the baffle tube. The top of the chamber may be removably secured in place, so that if necessary the parts can be readily inspected or repaired. The concentric annular well surrounding the central well segregates the entering and leaving liquid from the float sustaining portion, further assuring proper operation of the device.

The valve is so balanced as to operate freely at all times and the lost motion operating connections enable the float to positively operate the valve in both directions.

What is claimed is:

1. In a device of the character disclosed, a liquid chamber having liquid inlet above the bottom of the same and a liquid outlet at a lower level than said inlet, a baffle tube within said chamber, a float loosely guided in said baffle chamber, a float rod resiliently suspended in said chamber and having a loose connection with the float, an air vent, a slide valve controlling the same and operating connections from said float rod to said sliding valve, including a bell crank having one arm connected with the float rod and a link connected with the other arm of said bell crank and with said sliding valve.

2. An air release for liquid flow lines, comprising a chamber having an air vent provided with a valve seat and a track flush with said valve seat and extending to one side of the same, a valve member for riding over said track into sealing engagement with the valve seat, a float actuated member for so shifting said valve and loose resilient connecting means between the valve and said member enabling the valve to make self-adjusting engagement with the track and valve seat, said track extending to opposite sides of the valve seat and stop means limiting travel of the valve shifting member to one side of the valve seat.

3. An automatic air release for liquid flow lines, comprising in combinaton, a pressure storing liquid holding chamber having an air vent and said air vent being provided with a valve seat and a valve track extending to one side of said seat, a valve disc having free self-aligning sliding movement over said valve track and valve seat, a lever having a loose connection with said valve disc for sliding the latter over and away from the valve seat while permitting self-aligning movements of said valve disc in its travel over and away from the valve seat independent of the lever alignment, a spring between the lever and valve disc, the spring being sufficiently weak to maintain only a slight friction surface contact between the valve disc, valve track and seat and a float operating in the liquid chamber and connected to actuate said lever.

4. An automatic air release for liquid flow lines, comprising in combination, a pressure storing liquid holding chamber having an air vent and provided with a valve seat at the end of the same, a lever having a swinging movement in the general plane of said valve seat, a self-adjusting valve disc loosely connected with the valve lever for movement by the latter over and away from the valve seat and capable of adjustment to the valve seat independently of said valve lever, a spring between said lever and the valve disc, said spring being sufficiently weak to maintain only a slight friction surface contact between the valve disc and valve seat, the valve being sealed to its seat by prevailing pressure within the chamber when the valve is closed, and a float operating in the liquid chamber and connected to actuate said valve lever, the latter shifting the valve disc according to varying liquid levels in the chamber to cut off or open up the air vent while permitting said valve disc to independently adjust itself in its sliding movements over and away from the valve seat.

5. An automatic air release for liquid flow lines, comprising in combination, a pressure storing liquid holding chamber having an air vent provided with a valve seat, a lever mounted for swinging movement toward and away from said valve seat and provided with a pocket facing the valve seat, a valve disc loosely confined in said pocket and having a sliding movement over and away from the valve seat, a spring in the back of said pocket for lightly forcing the valve disc toward the valve seat, said spring being sufficiently weak to maintain only a slight friction surface contact of the valve disc with the valve seat, and a float operating in the liquid chamber and connected to actuate said lever.

In testimony whereof I affix my signature.

HARRY E. DOBSON.